Dec. 8, 1959  F. M. RYCK  2,915,769
WINDSHIELD WIPER BLADE
Filed July 10, 1957
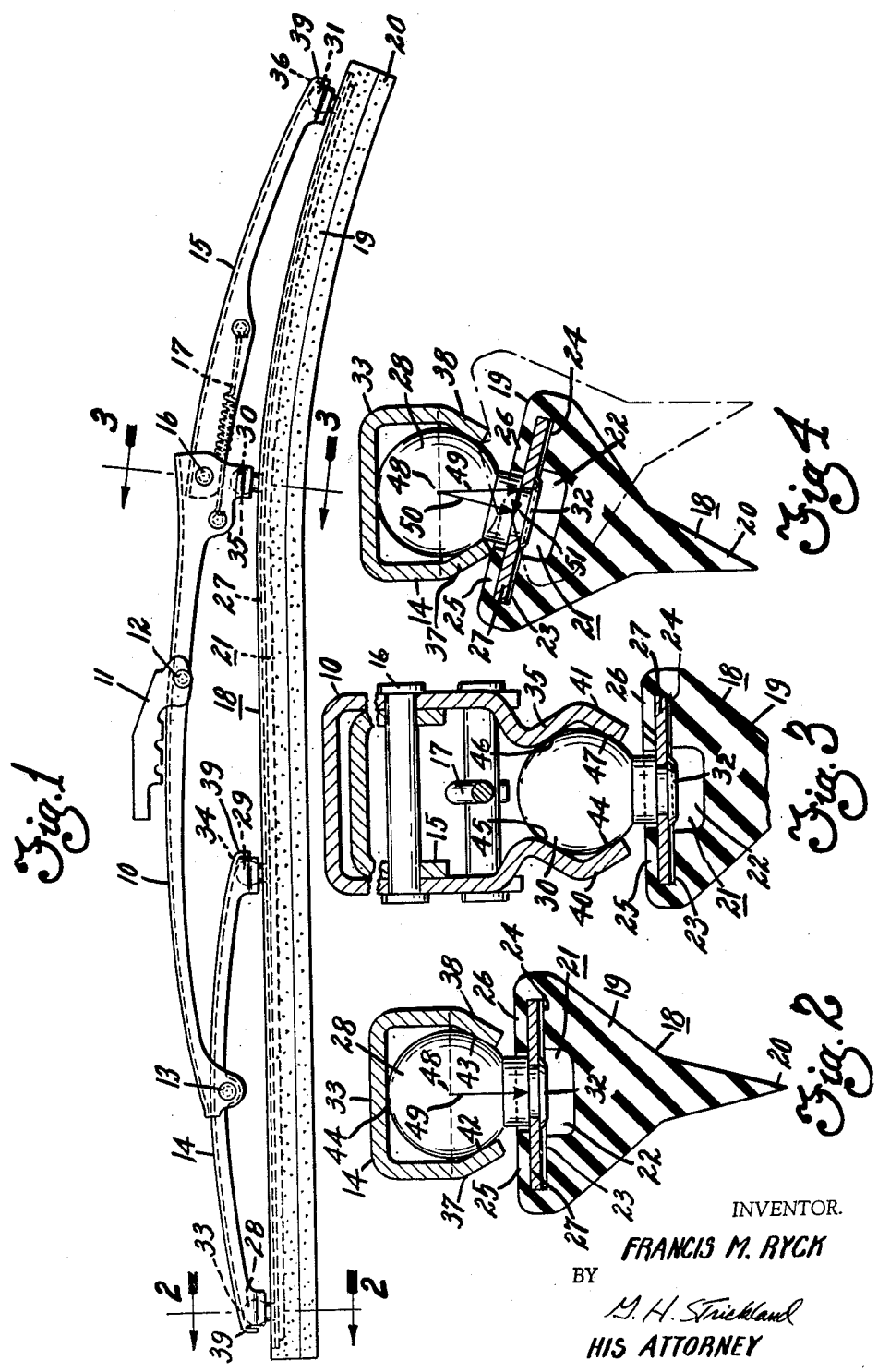
INVENTOR.
FRANCIS M. RYCK
BY
M. H. Strickland
HIS ATTORNEY United States Patent Office 2,915,769
Patented Dec. 8, 1959

2,915,769

WINDSHIELD WIPER BLADE

Francis M. Ryck, Rochester, N.Y., assignor to General Motors Corporation, Detroit, Mich., a corporation of Delaware Application July 10, 1957, Serial No. 671,042

9 Claims. (Cl. 15—245)

This invention pertains to windshield wipers, and particularly to a wiper blade for cleaning curved as well as substantially flat surfaces.

Heretofore, it has been customary in the design of wiper blades for cleaning curved surfaces to utilize a freely flexible rubber wiper element having an enlarged retention portion and a wiping portion which are connected by a reduced neck that permits tilting of the wiping portion relative to the retention portion. The retention portion is carried by a backing strip which is substantially freely flexible in a plane perpendicular to the surface to be wiped and substantially inflexible in a plane normal thereto. The squeegee unit, comprising the rubber wiping element and the backing strip, receives pressure from a wiper arm through a pressure distributing linkage, or superstructure, at a plurality of longitudinally spaced points by connections to the marginal edges of the backing strip. A wiper blade of this general construction is shown in copending application Serial No. 496,132 filed March 23, 1955, in the name of Cyril T. Wallis and assigned to the assignee of this invention. With a wiper blade construction of this type, it has been noted that the thin neck connecting the wiping and retention portions of the rubber element is subject to failure. In order to obviate this problem, the entire squeegee unit can be connected to the superstructure for limited tilting movement relative thereto as disclosed in my copending application Serial No. 624,095, filed November 23, 1956.

The present invention relates to an improved wiper blade wherein the arm pressure is applied to the backing strip at substantially the longitudinal axis, or medial portion, thereof while permitting the squeegee unit to tilt relative to the superstructure throughout a predetermined angle to facilitate proper cleaning of a surface. Accordingly, among my objects are the provision of a wiper blade assembly including a squeegee unit and a pressure distributing linkage having connections with the squeegee unit which permit limited tilting therebetween in both directions; the further provision of a backing strip having a plurality of longitudinally spaced, upstanding pressure receiving parts; the further provision of a wiper blade assembly for cleaning curved surfaces including a pressure distributing linkage which applies conforming pressure to the squeegee unit at substantially the longitudinal axis thereof, and the still further provision of a wiper blade assembly including ball and socket connections between the superstructure and the squeegee unit.

The aforementioned and other objects are accomplished in the present invention by encasing a flexible backing within a rubber wiping element and attaching a plurality of ball studs to the backing which are arranged to receive sockets formed integrally with the several members of the pressure distributing linkage. Specifically, the rubber wiping element has molded therein a backing chamber along the edge opposite the wiping edge. The wiping element is molded so that a pair of opposed anchoring ribs, or flaps, overhang portions of the backing chamber on opposite sides thereof, and the backing chamber terminates short of each end of the wiping element. The backing chamber of the wiping element receives a substantially uniformly resilient backing strip composed of flexible material such as metal or plastic. The backing strip is freely flexible in a plane normal to the surface to be wiped, and substantially inflexible in a plane at right angles thereto. In addition, the backing strip has attached thereto four upstanding connecting parts comprising ball studs, at longitudinally spaced points, one adjacent each end thereof and two in the intermediate portion thereof.

The superstructure is generally of the type shown in the aforementioned copending application Serial No. 496,132, and thus comprises a primary yoke, or holder, a secondary yoke, the intermediate portion of which is pivotally connected to one end of the holder, and a cantilever arm, one end of which is pivotally connected to the other end of the holder. In addition, the cantilever arm and the holder are interconnected by a compression spring which normally pivots the cantilever arm relative to the holder so as to apply a normally deforming pressure to the squeegee unit and form a curvilinear wiping edge. The ends of the pressure distributing member, comprising the holder, the secondary yoke and the cantilever arm are formed with integral sockets arranged to receive the upstanding ball studs attached to the backing strip. The socket portions of the pressure distributing member cooperate with the ball studs so as to limit tilting movement between the squeegee unit and the superstructure to a fixed, predetermined angle. In addition, the arm pressure applied to the holder is distributed to the squeegee unit by the pressure distributing linkage throughout the ball and socket connections in substantially the mid, or longitudinal, axis of the backing strip. The ball and socket connections between the pressure distributing linkage and the squeegee unit facilitate the proper lean, or drag, position of the squeegee unit during wiping operation. Moreover, the blade assembly of this invention will substantially prevent contact between the metal parts of the superstructure and the flexible backing, and the windshield so as to eliminate the possibility of scratching the surface of the windshield during severe wiping conditions, such as when the windshield is tacky.

Further objects and advantages of the present invention will be apparent from the following description, reference being had to the accompanying drawings, wherein a preferred embodiment of the present invention is clearly shown.

In the drawing:

Figure 1 is a side view in elevation of a wiper blade constructed according to this invention.

Figure 2 is an enlarged sectional view taken along line 2—2 of Figure 1.

Figure 3 is an enlarged fragmentary sectional view taken along line 3—3 of Figure 1.

Figure 4 is a view similar to Figure 2 showing the drag position of the wiping element wherein the connecting means between the superstructure and the backing strip limit tilting movement of the squeegee unit in both directions.

With particular reference to Figure 1, the wiper blade assembly of this invention includes a pressure distributing linkage, or superstructure, comprising a primary yoke 10 of channel shape having a suitable arm attaching clip 11 pivotally connected thereto by means of a rivet 12. The inner end of the primary yoke, or holder, 10 is connected by a pivot pin 13 to the intermediate portion of a secondary yoke 14 of channel shape. A cantilever arm 15 is connected by means of a pivot pin 16 to the outer end of the holder 10, and in addition the holder 10 and the cantilever arm 15, which is likewise of channel shape, are interconnected by a compression spring 17. The aforedescribed pressure distributing linkage, or superstructure, is of the type shown in the aforementioned copending application, Serial No. 496,132, in which a wiper arm applies pressure to a squeegee unit, designated generally by the numeral 18, and in addition, the tension spring 17 normally pivots the cantilever arm 15 relative to the holder 10 so as to deform the squeegee unit into a curvilinear shape as shown in Figure 1.

With particular reference to Figures 1 through 4, the squeegee unit 18 includes an elongate rubber wiping element 19 having a laterally flexible wiping edge, or lip 20, along one edge and a backing chamber 21 along the opposite edges. The backing chamber 21 terminates short of the ends of the rubber body 19 as indicated in Figure 1. The backing chamber 21 has an intermediate longitudinally extending depression as indicated by numeral 22 with shoulders 23 and 24 disposed on opposite sides thereof. The shoulders 23 and 24 are spaced from overhanging flaps 25 and 26, respectively, so as to provide a space for the reception of a flexible backing strip 27. The flexible backing strip 27 is composed of metal and, as shown, has a substantially greater width than thickness so as to be substantially inflexible in a plane parallel to the surface to be wiped while substantially freely flexible in a plane normal to the surface to be wiped. The backing strip 27 is retained in assembled relation with the rubber wiping element 19 by the overhanging flaps 25 and 26, and when pressure is applied thereto, the backing strip engages the shoulders 23 and 24 of the rubber wiping element. In addition, the closed ends of the backing chamber 21 prevent separation of the backing strip and the rubber wiping element and preclude relative longitudinal movement therebetween.

The backing strip 27 and the wiping element 19 constitute the squeegee unit 18. As shown in the drawing, the backing strip 27 has four ball studs 28, 29, 30 and 31 attached thereto to longitudinally spaced points. The ball studs include shank portions which extend through apertures in the medial portion of the backing strip and are thereafter peened thereover as indicated by numeral 32 to securely attach the ball studs to the backing strip. Each free end of the members in the pressure distributing linkage has an integral socket formed therewith as indicated by numerals 33, 34, 35 and 36. The integral sockets 33, 34 and 36 are of identical construction, and as shown in Figure 2, are formed by bending inwardly the marginal edges 37 and 38 of the side walls of the channel shaped members. In addition, the top wall of the channeled members is bent downwardly to form a tang 39 that prevents longitudinal separation of the ball studs from their respective sockets. The socket 35 is shown in Figure 3 and is formed by inwardly and outwardly bent portions of the side walls 40 and 41 of the channel section 10.

It is pointed out that the sockets 33, 34 and 35 have only line contact with the balls 28, 29 and 31, as shown in Figure 2, at points 42 and 43 at the sides of the ball and at point 44 at the top of the ball. The socket 35 has line contact with the ball 30 at four points as indicated by numerals 44, 45, 46 and 47. The line contact between the sockets and the balls reduces the frictional resistance to relative movement between the balls and the sockets to a minimum. In addition, the wiping pressure applied to the superstructure from a wiper arm, not shown, through the connector 11 is transmitted to the backing strip 27 through the balls 28, 29, 30 and 31 about which the respective sockets can pivot. As indicated by force arrow 49 in Figure 2, the pressure is applied at the vertical center line intersecting the center 48 to the longitudinal axis of the backing strip 27. When the squeegee unit 18 assumes a drag position relative to the superstructure as shown in Figure 4, the conforming pressure is still applied to the backing strip along its longitudinal axis, since the force indicated by arrow 49 includes a component indicated by arrow 50 which applies conforming pressure to the backing strip and a component indicated by arrow 51. It will be appreciated that since the backing strip 27 is substantially inflexible in the plane of arrow 51 while being substantially freely flexible in the plane of arrow 50, the components of the force indicated by arrow 50 will conform the blade to the curved surface.

It is further pointed out that the squeegee unit 18 is freely tiltable throughout an angle of substantially 15° relative to the superstructure as indicated in Figure 4 even though the conforming pressure is applied at substantially the longitudinal axis of the backing strip. The edge 37 of the sockets 33, 34 and 36 engages the shank of the ball stud to limit tilting movement in one direction as indicated by full lines in Figure 4, and the edge 38 of the sockets is engageable with the shank of the ball studs to limit tilting in the opposite direction as indicated by the dotted line in Figure 4. Similarly, with respect to the socket 35, the edges of the side walls 40 and 41 are engageable with the shank of ball stud 30 to limit tilting movement in both directions to a fixed angle. This enables the squeegee unit to assume the proper lean, or drag, position relative to the superstructure during movement of the wiper blade assembly across a surface to be cleaned.

The squeegee unit 18 is assembled with the superstructure by first inserting the ball stud 30 in the socket 35, and then deforming the squeegee unit to insert ball studs 28, 29 and 31 in their respective sockets. The overhanging tangs 39 on the sockets 33, 34 and 36 prevent longitudinal separation of the squeegee unit and the superstructure in operation, and the elongated sockets permit limited relative longitudinal movement between the squeegee unit and the superstructure as required to facilitate flexing movement of the squeegee unit between substantially planar and curved surfaces.

From the foregoing it is apparent that the present invention provides a unique backing strip having a plurality of upstanding connecting parts arranged to receive conforming pressure from a superstructure, which pressure is applied at substantially the longitudinal axis of the squeegee unit. In addition, the novel ball and socket connecting means between the squeegee unit and the superstructure cooperate to limit tilting movement of the squeegee unit in both directions during a wiping operation, and in addition the present construction enables the squeegee unit to be readily assembled and disassembled from the pressure applying superstructure without the use of tools of any kind.

While the embodiment of the invention as herein disclosed constitutes a preferred form, it is to be understood that other forms might be adopted, as may come within the scope of the claims which follow.

What is claimed is as follows:

1. A windshield wiper comprising, an elongate blade body having a longitudinally extending wiping edge and a backing chamber, a backing flexible in a plane normal to the surface to be wiped but substantially inflexible in a plane parallel to the surface to be wiped and arranged in the backing chamber for effecting conformance to a curved surface under applied pressure, and a plurality of longitudinally spaced upstanding ball studs attached thereto for receiving pressure from a pressure distributing linkage and applying said pressure to the medial portion of the backing.

2. A flexible backing for a wiper blade including, an elongate strip flexible in a plane normal to the surface to be wiped but substantially inflexible in a plane parallel to the surface to be wiped and having a plurality of longitudinally spaced upstanding ball studs attached thereto.

3. A flexible backing for a wiper blade including, an elongate flexible metal strip having a greater width than thickness so as to be substantially inflexible in a plane parallel to the surface to be wiped while being flexible in a plane normal to the surface to be wiped, said strip having a plurality of longitudinally spaced ball studs attached thereto substantially midway between the marginal edges thereof.

4. A curved wiper blade assembly including, a squeegee unit flexible in a plane normal to the surface to be wiped and substantially inflexible in a plane at right angles thereto, said squeegee unit having a plurality of longitudinally spaced, upstanding pressure receiving parts thereon located substantially midway between the marginal edges thereof, and a pressure distributing superstructure including a plurality of relatively movable members having complementary connecting parts at their free ends, one of said plurality of pressure receiving and complementary connecting parts comprising ball studs and the other of said plurality of pressure receiving and complementary connecting parts comprising sockets, said complementary connecting parts receiving the upstanding parts on said squeegee unit so as to apply conforming pressure thereto and being engageable therewith to limit relative tilting movement between the squeegee unit and the superstructure.

5. A curved wiper blade assembly including, a squeegee unit flexible in a plane normal to the surface to be wiped and substantially inflexible in a plane at right angles thereto, said squeegee unit having a plurality of longitudinally spaced upstanding ball studs attached to the medial portion thereof, and a pressure distributing superstructure including a plurality of relatively movable members having sockets at their free ends, said sockets receiving said ball studs so as to apply conforming pressure to said squeegee unit in the medial portion thereof and engageable with said ball studs to limit tilting movement between the squeegee unit and the superstructure.

6. A flexible backing for a wiper blade including, an elongate strip flexible in a plane normal to the surface to be wiped but substantially inflexible in a plane parallel to the surface to be wiped and having a plurality of longitudinally spaced upstanding ball studs attached thereto, said ball studs being attached to said backing strip midway between the marginal edges thereof so as to receive pressure and distribute said pressure to said backing strip along the longitudinal axis thereof.

7. A subassembly having a flexible wiper blade including, an elongate backing flexible in a plane normal to the surface to be wiped but substantially inflexible in a plane parallel to the surface to be wiped and having a plurality of longitudinally spaced upstanding pressure receiving parts attached thereto and located substantially midway between the marginal edges thereof, and a pressure applying superstructure including a plurality of relatively movable members having complementary pressure applying parts at their free ends, one of said plurality of pressure receiving and applying parts comprising ball studs and the other of said plurality of pressure receiving and applying parts comprising sockets, the parts on said backing and the parts on said members being adapted to mutually receive each other while cooperating to limit tilting movement between said backing and said superstructure in both directions.

8. A subassembly for a flexible wiper blade including, an elongate backing strip flexible in a plane normal to the surface to be wiped but substantially inflexible in a plane parallel to the surface to be wiped and having a plurality of longitudinally spaced upstanding ball studs attached thereto, and a pressure applying superstructure including a plurality of relatively movable members having sockets at their free ends adapted to receive said ball studs, said sockets including portions engageable with said ball studs to limit tilting movement between said superstructure and said backing in both drections.

9. A curved wiper blade assembly including, a squeegee unit flexible in a plane normal to the surface to be wiped but substantially inflexible in a plane at right angles thereto comprising an elongate blade body having a longitudinally extending wiper edge and a flexible backing carrying said blade body and having a plurality of longitudinally spaced upstanding ball studs attached thereto, and a pressure applying superstructure including a plurality of relatively movable members having sockets at their free ends, said sockets receiving said ball studs so as to apply conforming pressure to the squeegee unit and engageable with said ball studs to limit tilting movement between the squeegee unit and the superstructure, at least two of said sockets having means limiting longitudinal movement of the squeegee unit relative to the superstructure in both directions during normal wiping operation.

References Cited in the file of this patent

UNITED STATES PATENTS

| | | |
|---|---|---|
| 2,596,063 | Anderson | May 6, 1952 |
| 2,712,146 | Wise | July 5, 1955 |
| 2,792,586 | Chambers | May 21, 1957 |

FOREIGN PATENTS

| | | |
|---|---|---|
| 619,320 | Great Britain | Mar. 8, 1949 |